(12) United States Patent
Kim (10) Patent No.: US 9,184,615 B2
(45) Date of Patent: Nov. 10, 2015

(54) BATTERY PACK AND METHOD OF CONTROLLING THE SAME

(71) Applicant: Samsung SDI Co., Ltd., Yongin-si, Gyeonggi-do (KR)

(72) Inventor: Bong-Young Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 352 days.

(21) Appl. No.: 13/756,355

(22) Filed: Jan. 31, 2013

(65) Prior Publication Data

US 2014/0062387 A1 Mar. 6, 2014

(30) Foreign Application Priority Data

Aug. 29, 2012 (KR) .................. 10-2012-0095006

(51) Int. Cl.
*H02J 7/00* (2006.01)

(52) U.S. Cl.
CPC .............. *H02J 7/007* (2013.01); *H02J 7/0036* (2013.01); *H02J 7/0073* (2013.01); *H02J 2007/0037* (2013.01)

(58) Field of Classification Search
CPC ......... H02J 7/0016; H02J 7/007; Y02E 60/12
USPC .......................................... 320/107, 137, 162
See application file for complete search history.

(56) References Cited

U.S. PATENT DOCUMENTS

| | | | |
|---|---|---|---|
| 6,396,246 B2 | 5/2002 | Haraguchi et al. | |
| 7,405,539 B2 * | 7/2008 | Chen | 320/162 |
| 7,449,865 B2 * | 11/2008 | Wang et al. | 320/162 |
| 8,482,260 B2 * | 7/2013 | Hsieh et al. | 320/138 |
| 8,564,249 B2 * | 10/2013 | Lundqvist et al. | 320/138 |
| 8,836,277 B2 * | 9/2014 | Xu et al. | 320/107 |

FOREIGN PATENT DOCUMENTS

| | | |
|---|---|---|
| JP | 3655171 | 3/2005 |
| JP | 2008-288046 | 11/2008 |
| KR | 10-2000-0019006 | 4/2000 |
| KR | 10-1080597 B1 | 11/2011 |

OTHER PUBLICATIONS

English Machine Translation of JP 2008-288046 dated Nov. 27, 2008, 26 pages.

* cited by examiner

*Primary Examiner* — Sun Lin
(74) *Attorney, Agent, or Firm* — Christie, Parker & Hale, LLP (57) ABSTRACT

A battery pack including a battery including a battery cell, a first switching unit at a main current path between the battery and a terminal, a second switching unit at the main current path between the battery and the terminal, and serially coupled to the first switching unit, a third switching unit at a bypass current path coupled in parallel to at least a part of the main current path, and configured to block or to allow an electric current on the bypass current path, and a controller for dividing a charging section of the battery, and for controlling at least one of the first switching unit, the second switching unit, or the third switching unit according to divided charging sections to charge the battery.

20 Claims, 5 Drawing Sheets

BATTERY PACK AND METHOD OF CONTROLLING THE SAME

CROSS-REFERENCE TO RELATED PATENT APPLICATION

This application claims priority to and the benefit of Korean Patent Application No. 10-2012-0095006, filed on Aug. 29, 2012, in the Korean Intellectual Property Office, the disclosure of which is incorporated herein in its entirety by reference.

BACKGROUND

1. Field

Embodiments of the present invention relate to a battery pack and a method of controlling the battery pack.

2. Description of the Related Art

Secondary batteries (e.g., rechargeable batteries) are actively researched due to development of portable electronic devices, such as cellular phones, notebook computers, camcorders, and personal digital assistants (PDAs). Some secondary batteries are fabricated as a battery pack including a battery and a charging/discharging circuit, and the battery is respectively charged or discharged by an external power source or an external load via an external terminal of the battery pack. That is, when the battery pack is coupled to the external power source via the external terminal, the battery is charged by power from the external power source, the power being supplied via the external terminal and a charging/discharging circuit. In addition, when an external load is coupled to the battery pack via the external terminal, electric power of the battery is supplied to the external load via the charging/discharging circuit and the external terminal, and a discharging operation occurs. Here, the charging/discharging circuit between the external terminal and the battery controls the charging/discharging of the battery.

In general, the battery is charged with a maximum charging current until a voltage of the battery reaches a predetermined voltage, and then, the charging current is gradually reduced thereafter.

SUMMARY

Embodiments of the present invention provide a battery pack capable of reducing a charging time, and a method of controlling the battery pack.

According to an aspect of embodiments of the present invention, there is provided a battery pack including a battery including a battery cell, a first switching unit at a main current path between the battery and a terminal, a second switching unit at the main current path between the battery and the terminal, and serially coupled to the first switching unit, a third switching unit at a bypass current path coupled in parallel to at least a part of the main current path, and configured to block or to allow an electric current on the bypass current path, and a controller for dividing a charging section of the battery, and for controlling at least one of the first switching unit, the second switching unit, or the third switching unit according to divided charging sections to charge the battery.

The first switching unit or the second switching unit may include a charging control switching unit for charging the battery or a discharging control switching unit for discharging the battery.

The third switching unit may include a pre-charge switching unit.

The battery pack may further include a current restrictive resistor that is serially coupled to the pre-charge switching unit.

The controller may be configured to divide the charging section of the battery according to a relative state of charge (RSOC) ratio of the battery.

The controller may be configured to turn on the first switching unit and the second switching unit, and to turn off the third switching unit during a first section among the divided charging sections of the battery.

A first charging current may be applied to the battery during the first section via the main current path.

The first section may include a constant current (CC) charging section.

The controller may be configured to turn off the first switching unit, and to turn on the second switching unit and the third switching unit in a second section among the divided charging sections of the battery.

A second charging current that is less than the first charging current may be applied to the battery during the second section via the bypass current path.

The second section may include a constant current (CC) charging section, or may include the CC charging section and a CV charging section.

The controller may be configured to turn on the first switching unit and the second switching unit, and to turn off the third switching unit during a third section among the divided charging sections.

The first charging current may be applied to the battery during the third section via the main current path.

The third section may include a constant current (CC) charging section.

According to another aspect of embodiments of the present invention, there is provided a method of controlling a battery pack that includes a first switching unit and a second switching unit coupled to each other in series at a main current path between a battery and a terminal, and a third switching unit located at a bypass current path that is coupled to at least a part of the main current path in parallel, the third switching unit for switching a flow of an electric current on the bypass current path, the method including dividing a charging section of the battery into a plurality of sections, turning on the first switching unit and the second switching unit, and turning off the third switching unit to charge the battery during a first charging section of the plurality of sections, turning off the first switching unit, and turning on the second switching unit and the third switching unit to charge the battery during a second charging section of the plurality of sections, and turning on the first switching unit and the second switching unit, and turning off the third switching unit to charge the battery during a third charging section of the plurality of sections.

The charging section of the battery may be divided according to a relative state of charge (RSOC) ratio of the battery.

The method may further include applying a first charging current to the battery during the first charging section of the battery.

The method may further include applying a second charging current that is less than the first charging current to the battery during the second charging section of the battery.

The method may further include applying the first charging current to the battery during the third charging section.

The battery may be charged in a constant current (CC)/constant voltage (CV) mode, the first charging section may be the CC charging mode section, the second charging section may be the CC charging mode section or is both of the CC charging mode section and a CV charging mode section, and the third charging section may be the CV charging mode section.

BRIEF DESCRIPTION OF THE DRAWINGS

The above and other aspects of embodiments of the present invention will become more apparent by describing in detail exemplary embodiments thereof with reference to the attached drawings in which.

DETAILED DESCRIPTION

As embodiments of the invention allow for various changes and numerous embodiments, particular embodiments will be illustrated in the drawings and described in detail in the written description. However, this is not intended to limit the present invention to particular modes of practice, and it is to be appreciated that all changes, equivalents, and substitutions that do not depart from the spirit and technical scope of the present invention are encompassed in the present invention. In the description, certain detailed explanations of related art are omitted when they may unnecessarily obscure the essence of the invention.

Hereinafter, embodiments of the present invention will be described in detail by explaining preferred embodiments of the invention with reference to the attached drawings. Like reference numerals in the drawings denote like elements.

Figure 1:
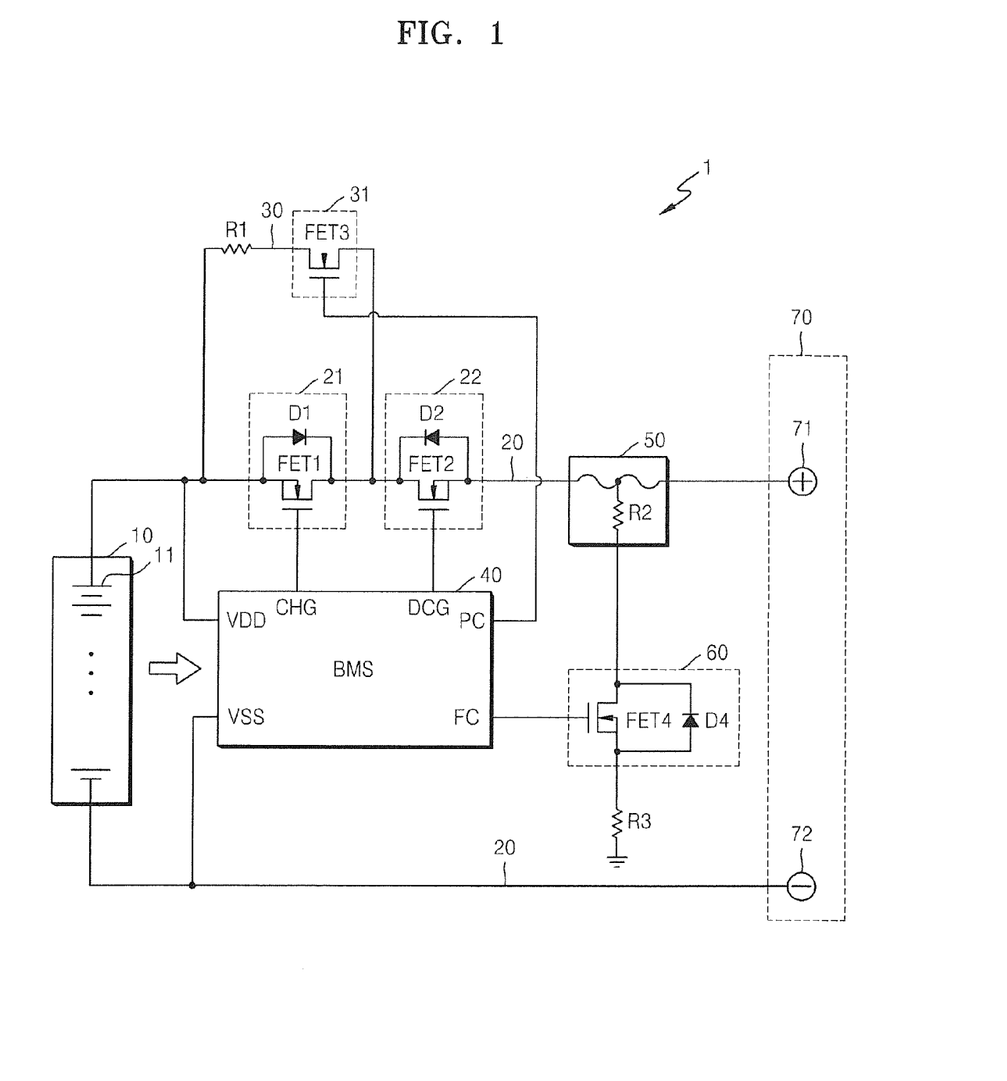
FIG. 1 is a diagram showing a battery pack according to an embodiment of the present invention.

FIG. 1 is a diagram showing a battery pack 1 according to an embodiment of the present invention. Referring to FIG. 1, the battery pack 1 includes a battery 10, a large-current path 20 (e.g., a main current path), a charging control switch 21, a discharging control switch 22, a bypass path 30, a pre-charge switch 31, a pre-charge resistor R1, a battery management system (BMS) 40 (e.g., a controller), a fuse 50, a fuse breaking switch 60, and a terminal unit 70.

The battery 10 supplies stored electric power to an electronic device to which the battery pack 1 is mounted or coupled. In addition, when a charger is coupled to the battery pack 1, the battery 10 may be charged by external electric power. The battery 10 may include one or more battery cells 11, which may be a rechargeable secondary battery such as, for example, a nickel-cadmium battery, a lead battery, a nick metal hydride battery (NiMH), a lithium ion battery, and a lithium polymer battery.

The large-current path 20 is a path through which charging and discharging current flows between the battery 10 and the terminal unit 70. The large-current path 20 includes a path formed between a positive terminal 71 and a positive electrode of the battery 10, and also formed between a negative terminal 72 and a negative electrode of the battery 10. A relatively large current flows on the large-current path 20.

The charging and discharging control switches 21 and 22 are formed or located on, or at, the large-current path 20 for controlling flow of charging and discharging current. The charging control switch 21 selectively blocks the charging current, and the discharging control switch 22 selectively blocks the discharging current.

The charging control switch 21 includes a field effect transistor FET1 and a parasitic diode D1. The field effect transistor FET1 is located to selectively block the current flow from the positive terminal 71 to the battery 10, and also from the battery 10 to the negative terminal 72. That is, the charging current flow may be blocked by using the field effect transistor FET1. Here, the field effect transistor FET 1 is formed so that the discharging current may flow through the parasitic diode D1.

The discharging control switch 22 includes a field effect transistor FET2 and a parasitic diode D2, and is located to selectively block the current flow from the negative terminal 72 to the battery 10, and also from the battery 10 to the positive terminal 71. That is, the flow of discharging current may be blocked by using the field effect transistor FET2. Here, the field effect transistor FET2 is located so that the charging current may flow through the parasitic diode D2. A source electrode and a drain electrode of the field effect transistor FET2 are coupled, or arranged, in a manner opposite to those of the field effect transistor FET1.

Figure 2:
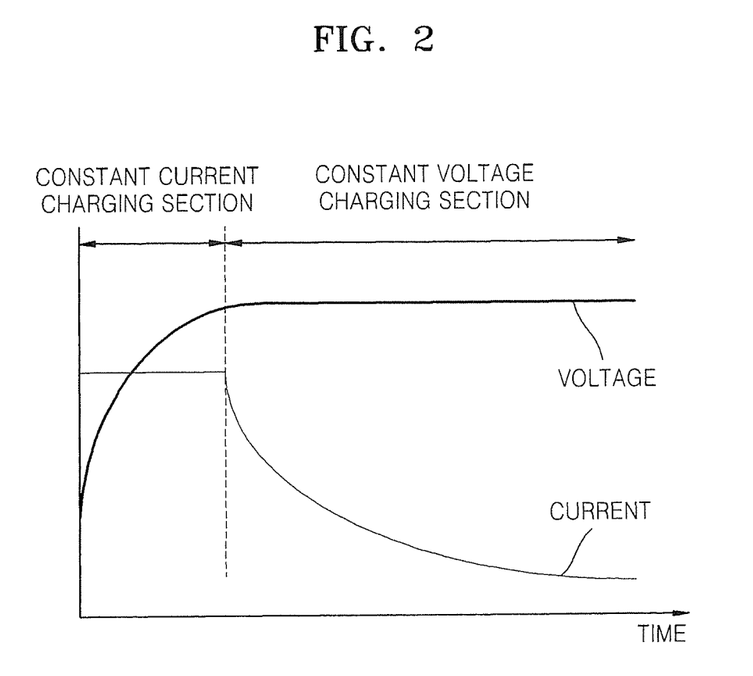
FIG. 2 is a charging curve graph of the battery pack of the embodiment shown in FIG. 1.

The bypass path 30 is coupled to at least a part of the large-current path 20 in parallel so as to enable pre-charging of the battery 10. The charging of the battery 10 is performed in a constant current and constant voltage (CC-CV) mode (e.g., with a constant current charging section and with a constant voltage charging section) as shown in FIG. 2. That is, at an initial stage of the charging, the charging is performed with a constant charging current, and when the charging level increases to a predetermined level, the charging is performed while maintaining a constant charging voltage. If the charging were to start by turning on the charging control switch 21 and the discharging control switch 22 when the battery 10 is fully discharged, excessive charging current would flow to the battery 10, thereby potentially damaging the battery 10. Thus, when the charging of the fully discharged battery 10 is performed, a remaining charging level of the battery 10 is precisely measured. Then, if a voltage level is very low, a pre-charging of the battery 10 is performed with a low current via the bypass path 30, and a main charging process is performed thereafter. Here, the main charging process may refer to the charging during a first section through a third section, which will be described later.

A pre-charge control switch 31 is located on the bypass path 30 to control the pre-charging of the battery 10, and includes a field effect transistor FET3 that is turned on when starting the constant current mode charging section (when the battery 10 is completely discharged) to avoid excessive charging current from being delivered to the battery 10. That is, when the charging of the completely discharged battery 10 starts, the charging control switch 21 and the discharging control switch 22 are turned off, and the pre-charge control switch 31 is turned on. Here, the charging current induced via the large-current path 20 flows to the bypass path 30 via the diode D2, and then, the charging current is adjusted (for example, to 30 mA) by the pre-charge resistor R1 to perform the pre-charging operation of the battery 10 before the main charging process. The pre-charge resistor R1 is formed or located on the bypass path 30 with the pre-charge control switch 31, and a resistance value increases to reduce the current to an acceptable level when a temperature of the battery cell or the pre-charge resistor R1 rises.

In the present embodiment, the charging control switch 21, the discharging control switch 22, and the pre-charge control switch 31 can be any suitable switching devices, and are not limited to field effect transistors. That is, various devices that perform switching functions may be used as the switching devices.

The BMS 40 controls the charging and discharging of the battery 10, the pre-charge, and the balancing of the battery cells 11 included in the battery 10. The BMS 40 may include a power terminal VDD, a ground terminal VSS, a charging control terminal CHG, a discharging control terminal DCG, a pre-charge control terminal PC, and a fuse control terminal FC.

A supply voltage and a ground voltage are respectively applied to the power terminal VDD and the ground terminal VSS. The charging control terminal CHG and the discharging control terminal DCG respectively output a charging control signal for controlling operations of the charging control switch 21, and a discharging control signal for controlling operations of the discharging control switch 22, when there are abnormal conditions in the battery pack 1. The pre-charge control terminal PC outputs a switching control signal for controlling operations of the pre-charge control switch 31 when excessive current is induced in the battery 10, or when the charging level of the battery 10 is noticeably reduced.

The BMS 40 monitors a charging state or a discharging state of the battery 10, and also monitors an internal current flowing state in the battery pack 1. In addition, the BMS 40 may measure intermediate voltages between the battery cells 11. The BMS 40 controls cell balancing between the battery cells 11, or controls the charging or discharging of the battery 10, according to results of the monitoring or measuring. Although not shown in FIG. 1, the BMS 40 may further include terminals for measuring the intermediate voltages, for monitoring the charging or discharging state, or for monitoring the flow of the electric current.

In the present embodiment, the BMS 40 controls each of the components in the battery pack 1, although the present invention is not limited thereto. For example, an analog front end for monitoring the state of the battery 10, and for controlling operations of the charging control switch 21 and the discharging control switch 22, may also be included in embodiments of the present invention, and may be controlled by the BMS 40.

The fuse 50 is formed between the terminal unit 70 on the large-current path 20 and the charging and discharging control switches 21 and 22. The fuse 50 is broken to prevent the charging or discharging current from flowing when the battery 10 is in an abnormal state. A resistor R2 corresponding to the fuse 50 is coupled between the large-current path 20 and ground. When electric current that is equal to or greater than a sufficient level (e.g., a predetermined level) flows through the resistor R2, the fuse 50 is melted due to the heat generated by the resistor R2, and the flow of the current is blocked.

If there is an abnormal state of the battery pack 1, the flow of the charging current or of the discharging current is blocked by using the charging and discharging control switches 21 and 22, respectively. However, if the abnormal state of the battery pack 1 is not corrected even when the charging and discharging control switches 21 and 22 are controlled, the fuse 50 is broken to block (e.g., permanently block) the flow of the current.

The fuse breaking switch 60 allows the electric current to flow through the resistor R2 included in the fuse 50 to thereby break the fuse 50. The fuse breaking switch 60 is formed between the fuse 50 and the ground, and is turned on when receiving a blocking signal from the BMS 40, thereby allowing the electric current to flow through the resistor R2. The fuse breaking switch 60 may include a field effect transistor FET4 and a parasitic diode D4.

The terminal unit 70 allows the battery pack 1 to be coupled to an external device such as, for example, an electronic device or a charger. The terminal unit 70 includes the positive terminal 71 and the negative terminal 72. The charging current is induced (e.g., received) and the discharging current is discharged through the positive terminal 71. Similarly, the charging current is discharged and the discharging current is induced through the negative terminal 72. Although not shown in FIG. 1, the terminal unit 70 may further include a terminal for transmitting data to the external device, or for receiving a control signal from the external device.

In the present embodiment, the BMS 40 controls the charging control switch 21, the discharging control switch 22, and the pre-charge control switch 31 for charging the battery 10, thereby allowing the battery 10 to be charged at a high speed. To do this, the BMS 40 divides a charging section (e.g., a charging phase) of the battery in the CC-CV mode into a plurality of sections, for example, first, second, and third sections. In addition, different charging currents may be charged in the battery 10 in the sections, and switching operations of the charging and discharging control switches 21 and 22 and of the pre-charge control switch 31 are controlled.

Figure 3:
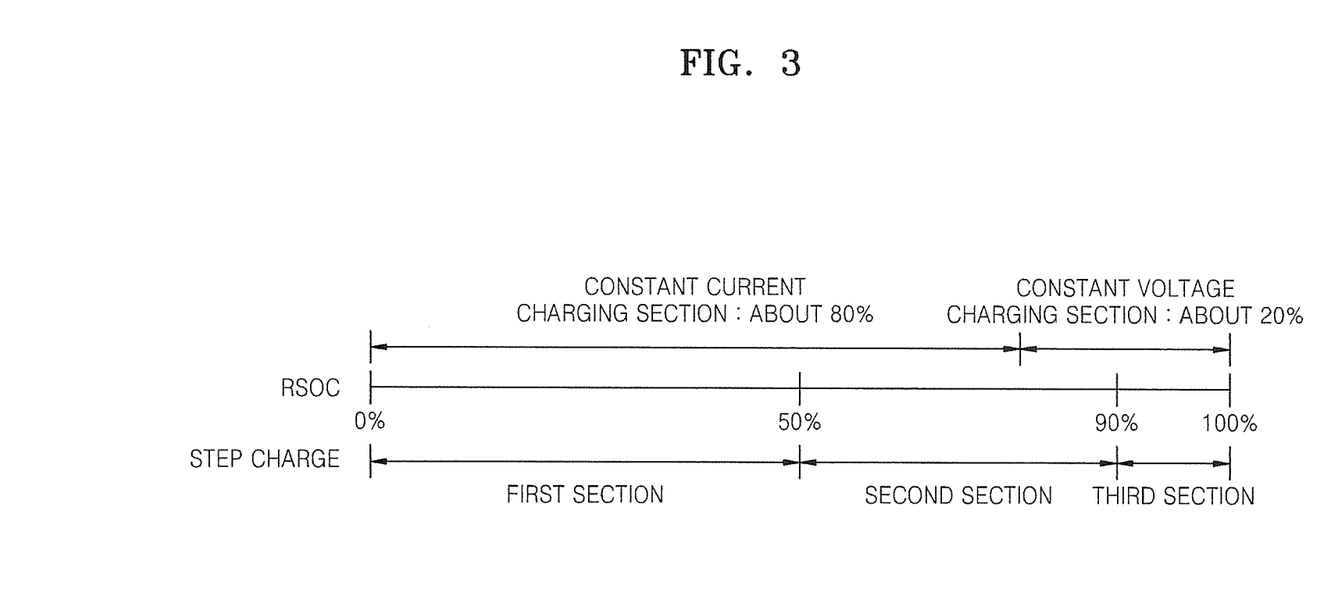
FIG. 3 is a diagram illustrating division of charging sections during a main charging after a pre-charging of the battery pack of the embodiment shown in FIG. 1.

FIG. 3 is a diagram showing a charging section division of the battery 10 during a main charging process after the pre-charge operation is finished. Referring to FIG. 3, dividing of the charging section of the battery 10 is based on a ratio of a relative state of charge (RSOC) of the battery 10 (e.g., a ratio of an amount of energy stored in the battery to a nominal rated capacity). For example, the first section may be a section in which the RSOC ratio of the battery 10 is about 0% to 50%, the second section may be a section in which the RSOC ratio of the battery 10 is about 51% to 90%, and the third section may be a section in which the RSOC ratio of the battery 10 is about 91% to 100%. After dividing the charging section of the battery 10, the first section is located in the constant current (CC) mode section, and the third section is located in the constant voltage (CV) mode section. Meanwhile, the second section may be located in the CC mode section, or may be located in both of the CC mode and the CV mode sections.

In the present embodiment, the charging section of the battery 10 is divided into the first through third sections, the charging is performed by a first charging current in the first section, by a second charging current, which is less than the first charging current, in the second section, and by the first charging current in the third section. The charging is performed by controlling the three switches, that is, the charging, discharging, and pre-charge control switches 21, 22, and 31. Here, the first and second charging sections may be the CC charging section, and the third charging section may be the CV charging section. In the present embodiment, the number of divided sections of the charging section and the number of the switches are equal to each other, although the present invention is not limited thereto, that is, the number of the charging sections and the switches as shown in FIG. 1 may be expanded or changed.

Figure 4A:
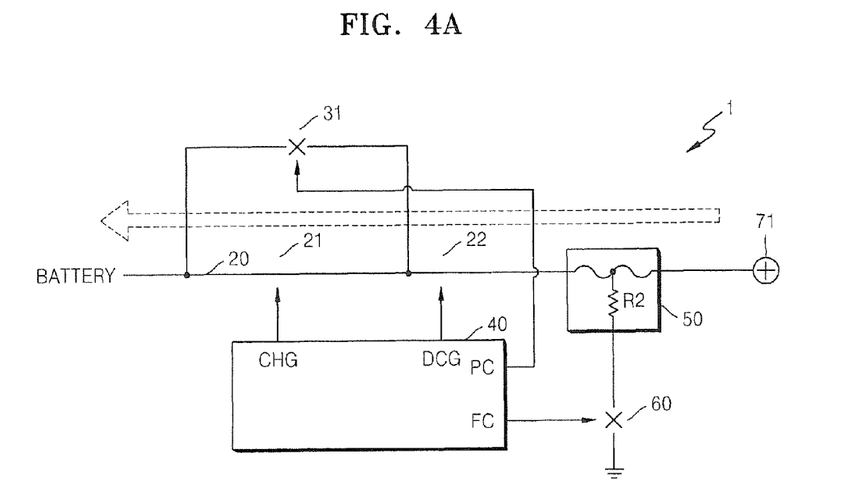
FIGS. 4A and 4B are diagrams illustrating operations according to the battery charging sections of the battery pack of the embodiment shown in FIG. 1.

The BMS 40 measures the ROSC ratios, and if the ROSC ratio is equal to or less than 50%, the BMS 40 recognizes the section as the first section and performs the charging of the battery 10. During the first section, the BMS 40 turns on the charging and discharging control switches 21 and 22, and turns off the pre-charge control switch 31. In the present embodiment, the BMS 40 turns off the fuse breaking switch 60 under an assumption that the battery pack 1 is operating normally. FIG. 4A is a diagram showing an operation of the battery pack 1 in the first section. Referring to FIG. 4A, the BMS 40 turns on the charging control switch 21 via the charging control terminal CHG, turns on the discharging control switch 22 via the discharging control terminal DCG, turns off the pre-charge control switch 31 via the pre-charge control terminal PC, and turns off the fuse breaking switch 60 via the fuse control terminal FC. Through the above operations, the charging current is induced in the battery 10 from the terminal unit 70 via the large-current path 20. Here, a first charging current is induced in the battery 10, and the first charging current corresponds to a maximum charging current ensured by the cell combinations, for example, 1 C (e.g., wherein C represents the maximum charging current ensured by the cell combinations).

Figure 4B:
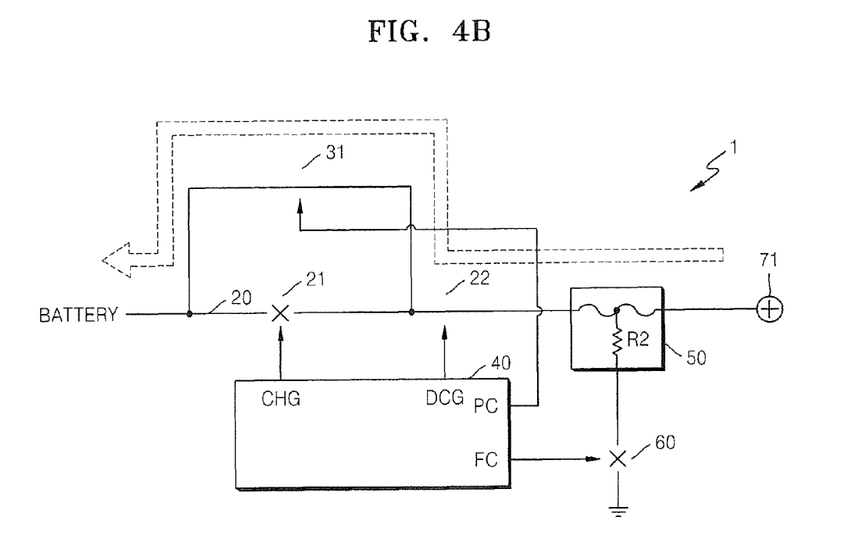

When the battery 10 is charged by the first charging current, and the ROSC ratio becomes about 50%, the BMS 40 determines the battery to be in the second section of the charging section, and continues the charging operation of the battery 10. In the second section, the BMS 40 turns off the charging control switch 21 and the fuse breaking switch 60, and turns on the discharging control switch 22 and the pre-charge control switch 31. FIG. 4B is a diagram showing an operation of the battery pack 1 in the second section. Referring to FIG. 4B, the BMS 40 turns off the charging control switch 21 via the charging control terminal CHG, turns on the discharging control switch 22 via the discharging control terminal DCG, turns on the pre-charge control switch 31 via the pre-charge control terminal PC, and turns off the fuse breaking switch 60 via the fuse control terminal FC. Through the above operations, the charging current is induced in the battery 10 from the terminal unit 70 via the bypass path 30. Here, a second charging current that is less than the first charging current is induced in the battery 10, and the second charging current corresponds to a standard charging current ensured by the cell combinations, for example, 0.5 C (e.g., one-half of the maximum charging current). When the battery 10 is charged by the second charging current, and the ROSC ratio becomes about 90%, the BMS 40 recognizes the battery as being in the third section of the charging section, and continues the charging operation of the battery 10. In the third section, the BMS 40 turns on the charging and discharging control switches 21 and 22, and turns off the pre-charge control switch 31 and the fuse breaking switch 60. The charging operation in the third section is performed in the same manner as that of the first section, and descriptions thereof are not provided here. As described above, since the third section is the part of the charging section that is in the CV mode, the charging of the battery 10 may be normally performed even when the first charging current is induced.

As described above, the charging section of the battery is divided into the first through third sections, and then, the battery 10 is charged with the first charging current that is relatively large in the first section, and is charged with the second charging current that is smaller than the first charging current in the second section, thereby reducing the charging time.

Figure 5:
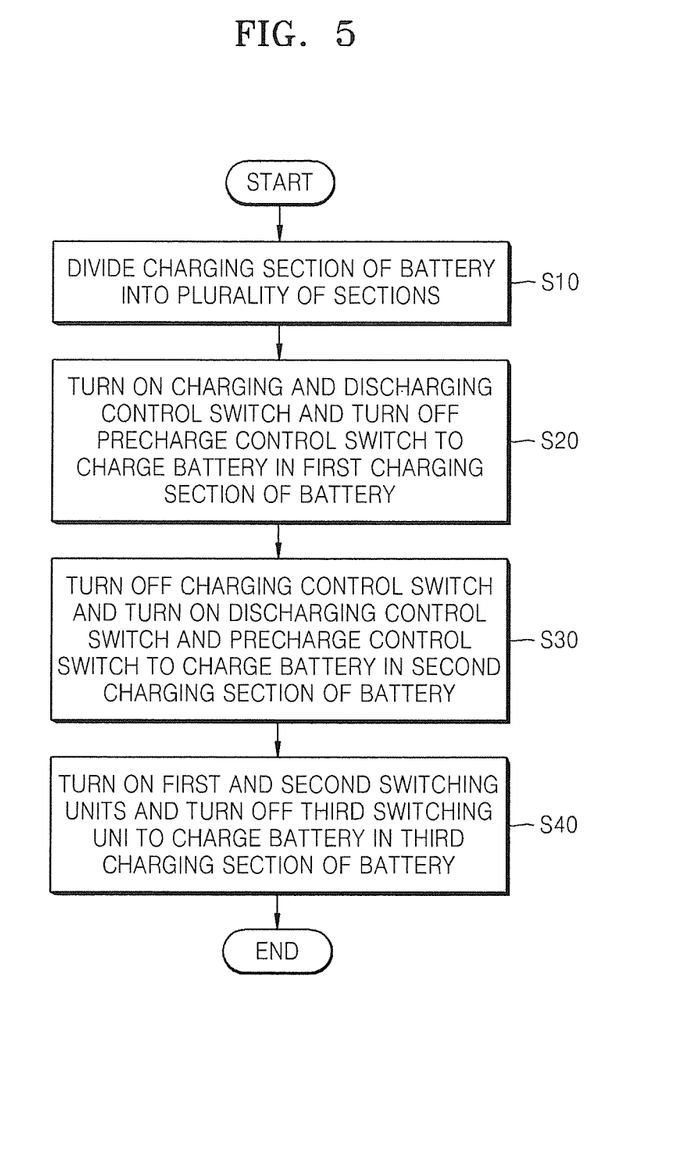
FIG. 5 is a flowchart illustrating a method of controlling a battery pack according to an embodiment of the present invention.

FIG. 5 is a flowchart illustrating a method of controlling a battery pack according to an embodiment of the present invention. The method of controlling the battery pack according to the present embodiment may be performed with the BMS 40 with peripheral components shown in FIG. 1. Hereinafter, descriptions of the components described with reference to FIGS. 1 through 4 are omitted.

Referring to FIG. 5, the BMS 40 divides the charging section of the battery 10 into a plurality of sections (S10), and may do so based on the RSOC ratio of the battery 10. For example, a section in which the RSOC ratio of the battery 10 is about 0% to 50% is the first section, a section in which the RSOC ratio of the battery 10 is about 51% to 90% is the second section, and a section in which the RSOC ratio of the battery 10 is about 91% to 100% is the third section.

After that, the BMS 40 measures the RSOC ratio, and if the RSOC ratio is 50% or less, the BMS 40 recognizes it as the first section, and the BMS 40 turns on the charging and discharging control switches 21 and 22 and turns off the pre-charge control switch 31 to thereby charge the battery 10 (S20). Here, it is assumed that the fuse breaking switch 60 is in the turned-off state in consideration that the battery pack 1 is normally operating. Through the switching control operations, the first charging current is induced in the battery 10 from the terminal unit 70 via the large-current path 20. When the battery 10 is charged with the first charging current and the RSOC ratio becomes about 50%, the BMS 40 recognizes the battery as being in the second section, and the BMS 40 turns off the charging control switch 21, turns on the discharging control switch 22 and the pre-charge control switch 31, and turns off the pre-charge control switch 31 to charge the battery 10 (S30). Through the switching control operation, the second charging current is induced in the battery 10 from the terminal unit 70 via the bypass path 30.

When the battery 10 is charged with the second charging current and the ROSC ratio becomes about 90%, the BMS 40 recognizes the battery as being in the third section, and turns on the charging and discharging control switches 21 and 22 and turns off the pre-charge control switch 31 to charge the battery 10 (S40). Through the above switching control operation, the first charging current is induced in the battery 10 from the terminal unit 70 via the large-current path 20. As described above, since the third section is the CV mode charging section, the charging of the battery 10 may be normally performed even when the first charging current is induced.

According to embodiments of the present invention, the charging section of the battery is divided so that the battery may be charged with different currents in each of the sections, thereby reducing the charging time.

While embodiments of the present invention have been particularly shown and described with reference to exemplary embodiments thereof, it will be understood by those of ordinary skill in the art that various changes in form and details may be made therein without departing from the spirit and scope of the present invention as defined by the following claims, and their equivalents.

What is claimed is:

1. A battery pack comprising:
a battery comprising a battery cell;
a first switching unit at a main current path between the battery and a terminal;
a second switching unit at the main current path between the battery and the terminal, and serially coupled to the first switching unit;
a third switching unit at a bypass current path coupled in parallel to at least a part of the main current path, and configured to block or to allow an electric current on the bypass current path; and
a controller for dividing a charging section of the battery into a plurality of divided charging sections, and for controlling at least one of the first switching unit, the second switching unit, or the third switching unit according to the divided charging sections to charge the battery.

2. The battery pack of claim 1, wherein the first switching unit or the second switching unit comprises a charging control switching unit for charging the battery or a discharging control switching unit for discharging the battery.

3. The battery pack of claim 1, wherein the third switching unit comprises a pre-charge switching unit.

4. The battery pack of claim 3, further comprising a current restrictive resistor that is serially coupled to the pre-charge switching unit.

5. The battery pack of claim 1, wherein the controller is configured to divide the charging section of the battery according to a relative state of charge (RSOC) ratio of the battery.

6. The battery pack of claim 1, wherein the controller is configured to turn on the first switching unit and the second switching unit, and to turn off the third switching unit during a first section among the divided charging sections of the battery.

7. The battery pack of claim 6, wherein a first charging current is applied to the battery during the first section via the main current path.

8. The battery pack of claim 6, wherein the first section comprises a constant current (CC) charging section.

9. The battery pack of claim 1, wherein the controller is configured to turn off the first switching unit, and to turn on the second switching unit and the third switching unit in a second section among the divided charging sections of the battery.

10. The battery pack of claim 9, wherein a second charging current that is less than a first charging current is applied to the battery during the second section via the bypass current path.

11. The battery pack of claim 9, wherein the second section comprises a constant current (CC) charging section, or comprises the CC charging section and a constant voltage (CV) charging section.

12. The battery pack of claim 1, wherein the controller is configured to turn on the first switching unit and the second switching unit, and to turn off the third switching unit during a third section among the divided charging sections.

13. The battery pack of claim 12, wherein a first charging current is applied to the battery during the third section via the main current path.

14. The battery pack of claim 12, wherein the third section comprises a constant current (CC) charging section.

15. A method of controlling a battery pack that comprises: a first switching unit and a second switching unit coupled to each other in series at a main current path between a battery and a terminal; and a third switching unit located at a bypass current path that is coupled to at least a part of the main current path in parallel, the third switching unit for switching a flow of an electric current on the bypass current path, the method comprising:
dividing a charging section of the battery into a plurality of sections;
turning on the first switching unit and the second switching unit, and turning off the third switching unit to charge the battery during a first charging section of the plurality of sections;
turning off the first switching unit, and turning on the second switching unit and the third switching unit to charge the battery during a second charging section of the plurality of sections; and
turning on the first switching unit and the second switching unit, and turning off the third switching unit to charge the battery during a third charging section of the plurality of sections.

16. The method of claim 15, wherein the charging section of the battery is divided according to a relative state of charge (RSOC) ratio of the battery.

17. The method of claim 15, further comprising applying a first charging current to the battery during the first charging section of the battery.

18. The method of claim 17, further comprising applying a second charging current that is less than the first charging current to the battery during the second charging section of the battery.

19. The method of claim 17, further comprising applying the first charging current to the battery during the third charging section.

20. The method of claim 15, wherein:
the battery is charged in a constant current (CC) charging mode section and/or a constant voltage (CV) charging mode section;
the first charging section is the CC charging mode section;
the second charging section is the CC charging mode section or is both of the CC charging mode section and the CV charging mode section; and
the third charging section is the CV charging mode section.

* * * * *